United States Patent
Vanmak

(10) Patent No.: US 11,385,798 B1
(45) Date of Patent: Jul. 12, 2022

(54) METHOD AND SYSTEM FOR APPLICATION AWARE, MANAGEMENT OF WRITE OPERATIONS ON NON-VOLATILE STORAGE

(71) Applicant: Lightbits Labs Ltd., Kfar Saba (IL)

(72) Inventor: Maor Vanmak, Magal (IL)

(73) Assignee: Lightbits Labs Ltd., Kfar Saba (IL)

( * ) Notice: Subject to any disclaimer, the term of this patent is extended or adjusted under 35 U.S.C. 154(b) by 0 days.

(21) Appl. No.: 17/134,577

(22) Filed: Dec. 28, 2020

(51) Int. Cl.
*G06F 3/06* (2006.01)
*G06F 12/02* (2006.01)

(52) U.S. Cl.
CPC .......... *G06F 3/0616* (2013.01); *G06F 3/0644* (2013.01); *G06F 3/0652* (2013.01); *G06F 3/0679* (2013.01); *G06F 12/0246* (2013.01); *G06F 12/0253* (2013.01); *G06F 2212/1036* (2013.01); *G06F 2212/2022* (2013.01)

(58) Field of Classification Search
CPC .... G06F 3/0616; G06F 3/0644; G06F 3/0652; G06F 3/0679; G06F 12/0246; G06F 12/0253; G06F 2212/1036; G06F 2212/2022
See application file for complete search history.

(56) References Cited

U.S. PATENT DOCUMENTS

| | | | |
|---|---|---|---|
| 9,891,859 B1 * | 2/2018 | Vogan | G06F 3/0653 |
| 10,417,243 B1 | 9/2019 | Singh et al. | |
| 10,812,319 B1 | 10/2020 | Prakash et al. | |
| 2007/0294499 A1 * | 12/2007 | Garthwaite | G06F 12/0253 711/170 |
| 2011/0296133 A1 * | 12/2011 | Flynn | G06F 3/0619 711/171 |
| 2012/0272132 A1 | 10/2012 | Mondal et al. | |
| 2012/0297117 A1 * | 11/2012 | Jo | G06F 12/0246 711/103 |
| 2014/0136575 A1 | 5/2014 | Zhao et al. | |
| 2014/0372490 A1 | 12/2014 | Barrus et al. | |
| 2016/0313922 A1 | 10/2016 | Kojima | |
| 2016/0350213 A1 | 12/2016 | Patil et al. | |
| 2016/0380977 A1 | 12/2016 | Bean et al. | |
| 2017/0054824 A1 | 2/2017 | Friedman | |
| 2017/0153848 A1 | 6/2017 | Martineau et al. | |
| 2017/0187533 A1 | 6/2017 | Raj et al. | |

(Continued)

OTHER PUBLICATIONS

Office Action for U.S. Appl. No. 16/014,004, dated Aug. 5, 2019.

(Continued)

*Primary Examiner* — Tasnima Matin
(74) *Attorney, Agent, or Firm* — Pearl Cohen Zedek Latzer Baratz LLP

(57) ABSTRACT

A system and method of managing storage on non-volatile memory (NVM) storage media, by at least one processor, may include receiving, from at least one client computing device, one or more data write requests, associated with application metadata, to store one or more respective data objects on the NVM storage media; performing a first classification of the one or more data objects, based on the application metadata, so as to associate each data object to a group of data objects; storing the data objects of each group in a dedicated storage set of a logical address space; and transmitting, or copying the data objects of each storage set to be stored in a respective, dedicated range of the NVM storage media.

16 Claims, 6 Drawing Sheets

(56) References Cited

U.S. PATENT DOCUMENTS

| | | | |
|---|---|---|---|
| 2018/0011527 A1* | 1/2018 | Kim | G06F 3/0625 |
| 2018/0364924 A1 | 12/2018 | Fukutomi et al. | |
| 2019/0121889 A1* | 4/2019 | Gold | G06F 16/2255 |
| 2019/0377494 A1* | 12/2019 | Rao | G06F 12/0246 |
| 2020/0133840 A1 | 4/2020 | Zhou et al. | |
| 2021/0248069 A1* | 8/2021 | Jang | G06F 3/0604 |

OTHER PUBLICATIONS

Office Action for U.S. Appl. No. 16/429,304, dated May 27, 2020.
Office Action for U.S. Appl. No. 16/449,610, dated Jul. 20, 2020.
Notice of Allowance for U.S. Appl. No. 16/429,304, dated May 14, 2021.

* cited by examiner

METHOD AND SYSTEM FOR APPLICATION AWARE, MANAGEMENT OF WRITE OPERATIONS ON NON-VOLATILE STORAGE

FIELD OF THE INVENTION

The present invention relates generally to non-volatile computer data storage systems. More specifically, the present invention relates to application-aware storage management on non-volatile memory (NVM) devices.

BACKGROUND OF THE INVENTION

NVM devices, such as flash memory devices and solid-state drives (SSDs) have become ubiquitous in a variety of computerized applications. The inherent speed of data fetching from NVM devices, as well as the lack of moving mechanical parts and relatively small aspect ratio have made these devices a preferable selection to hard-disk storage systems, in applications ranging from Internet-of-Things (IoT) devices to cloud-based servers.

NVM storage devices may consist of Not And (NAND) cells in an organized layout. Of importance is the block layer, the smallest unit which can be erased. Each block in the block layer contains a number of pages, the smallest unit which can be programmed (i.e. written to).

In order to re-use or rewrite a page, the entire block containing the page, and all other pages in that block must first be erased or relocated. Thus, when data is being rewritten, the new data is always written to a free page. The old data is marked for deletion, but must wait for the other pages in the block to be marked for deletion (and their data must be relocated). This configuration of NVM devices therefore inherently propagates an increased number of read and write cycles, also known as "Program Erase" (PE) cycles. However, blocks are limited by the number of PE cycles which can be performed before malfunction occurs.

Non-volatile storage devices (e.g., Flash devices) have an internal garbage-collection (GC) mechanism, responsible for reclaiming invalid pages (pages that may be erased for re-writing). As known in the art, GC mechanisms may scan for candidate blocks to be reclaimed.

For example, the GC mechanism may identify one or more first blocks, having a large portion of invalid pages as candidates for garbage collection. The GC mechanism may copy valid pages of the one or more candidate blocks to at least one second block. Subsequently, the GC mechanism may erase the one or more first blocks and mark them as free to be re-used for future writes.

Write operations can be divided into two types: writes generated by the internal GC mechanism and writes generated by an external processor (i.e. generated externally to the NVM manager unit), for example as part of the execution of an application. Since the NVM device is limited by the overall number of PE cycles it may sustain, it is desirable to minimize the number of write operations that are generated by the internal GC process.

The write amplification (WA) parameter is a metric used to measure the relation between external write operations and internal, GC write operations, and is defined in the following equation, Eq. 1:

$$WA = (External\_Writes + GC\_Writes)/(External\_Writes) \quad (Eq. 1)$$

In order to improve the lifetime and endurance of NVM devices, it is desired to keep WA at a minimal value. Ideally, it is desired to have no GC write operations at all, and have the WA value equal to 1.

SUMMARY OF THE INVENTION

Currently available systems and methods for management of NVM storage media may not take into account application-specific aspects of the stored data, and thus increase the number of GC write operations, increase storage device latency, and have a detrimental effect to the endurance and reliability of NVM storage devices.

Alternatively, systems and methods for management of NVM storage media may require adaptations to their operating system, in order to facilitate efficient, application-specific storage of data objects on underlying NVM storage devices.

Embodiments of the present invention may include a practical application for efficiently storing data objects on NVM storage media. Embodiments of the present invention may include an improvement over currently available storage systems by (a) classifying incoming data objects for storage, (b) assigning each data object to a specific storage set according to its classification, and (c) managing storage of each storage set separately. By doing (a), (b), and (c) above, embodiments of the invention may optimally manage the storage of data objects on NVM storage media. In this context, the term "optimal" may be used to indicate a storage scheme is application-aware, in a sense that it is tailor-made to address specific characteristics of data objects of each application.

Additionally, as each storage set may be handled separately, and may employ a separate GC mechanism, embodiments of the invention may prevent mixture of storage of data objects that pertain to different storage classifications. It has been experimentally shown that such separation of storage of data objects may decrease the overall number of GC writes, decrease the WA value, and thus improve the reliability and endurance of NVM storage devices. Additionally, as known in the art, the reduction of GC writes may also improve storage latency (e.g., read average latency, read tail latency, etc.) and thus also improve performance of applications that utilize the NVM storage.

According to some embodiments, data objects may be iteratively classified according to characteristics of data object size, "seriality" and "temperature". The term "seriality" may be used herein to indicate the extent to which a data object is stored in a serial manner, as elaborated herein. The term "temperature" may be used herein to indicate the extent to which a specific data object or data block is updated or overwritten over time, as elaborated herein. The data objects may be classified iteratively, in a sense that a decision or assignment of a data object to a specific classification may be changed over time, e.g., as a result of incoming information, data or metadata, as elaborated herein.

For example, embodiments of the invention may receive, e.g., from an application that is executed on a client computing device, a new data object for storage. Embodiments of the invention may perform a-priory classification of the new data object to a first group or class of a plurality of groups or classes, based on application metadata, as elaborated herein. Subsequently, embodiments may modify or amend the classification of that data object, e.g., assign the data object as a member of a second, different group or class, based for example on GC-related metadata.

Embodiments of the invention may include a method of managing storage on non-volatile memory (NVM) storage media, by at least one processor. The at least one processor may be configured to: receive, from at least one client computing device, one or more data write requests, the data write requests associated with application metadata, to store one or more respective data objects on the NVM storage media. The at least one processor may perform a first, or a-priori classification of the one or more data objects, based for example, on the application metadata, so as to associate each data object to a group of data objects. The at least one processor may store the data objects of each group in a dedicated storage set of a logical address space, and may subsequently transmit, copy or move the data objects of each storage set to be stored in a respective, dedicated range of the NVM storage media.

According to some embodiments of the invention, the at least one processor may be configured to: compute a first seriality value of the one or more data objects, based on the application metadata; compare the first seriality value to one or more seriality threshold values; and perform the first classification further based on the comparison of the computed first seriality value to the one or more seriality threshold values.

Additionally, or alternatively, the at least one processor may compute a size of the one or more data objects, based on the application metadata, and perform the first classification further based on the computed size.

According to some embodiments of the invention, the at least one processor may be configured to assign a dedicated GC mechanism for each storage set of the logical address space. The dedicated GC mechanism may perform, within the respective storage set, a dedicated GC process on data objects that may be stored in the respective storage set.

According to some embodiments of the invention, the at least one processor may be configured to: obtain, from a GC mechanism dedicated to a first storage set, GC metadata of a data object, included within the first storage set. The at least one processor may perform a second, or a posteriori classification of the data object, based on the GC metadata; update the association of the data object, from the first group to a second group, according to the GC metadata; move the data object to a second storage set, dedicated to the second group; and store the data object in a range of the NVM storage media that may be dedicated to the second storage set.

Additionally, or alternatively, the at least one processor may perform a second classification of the data object by: computing a "time between rewrites" (TBR) value of the data object; comparing the computed TBR value to one or more TBR threshold values; and updating the association of the data object, from the first group to a second group, based on said comparison.

According to some embodiments of the invention, each storage set may be associated with one or more specific values of TBR thresholds.

According to some embodiments of the invention, the at least one processor may compute a second, or a posteriori seriality value of the one or more data objects based on the GC metadata. The processor may subsequently perform a second, or a posteriori classification or grouping of the data object, based on the computed, second seriality value. Additionally, or alternatively, the at least one processor may maintain the first seriality value as historical data, and performing the second, a posteriori classification of the data object, based on the first seriality value and the computed, second seriality value.

According to some embodiments of the invention, the application metadata may include, for example, a range of addresses pertaining to one or more data objects, a size of one or more data objects, a timestamp indicating a time of reception of a data write request of a data object, one or more application-level block addresses pertaining to a specific data write request, one or more logical-level block addresses that pertain to a specific data write request, an identification of a namespace to which data object pertains, an identification of an application to which the data object pertains, an identification of a client computing device to which data object pertains, an identification of a data stream to which data object pertains, and an identification of a working set to which the data object pertains.

According to some embodiments of the invention, the GC metadata may include, for example, an age value of the data object, a validity status value of the data object, and a TBR value of the data object.

Embodiments of the invention may include a method of managing storage on NVM storage media, by at least one processor. Embodiments of the method may include: receiving, from one or more client computing devices, a plurality of data write requests may include application metadata, to store a plurality of respective data objects on the NVM storage media; computing data object seriality from the application metadata; grouping the data objects according to the data object seriality; storing the data objects of each group in a dedicated storage set of a logical address space; and storing the data objects of each storage set in a respective, dedicated range of the NVM storage media.

Embodiments of the invention may include a system for managing storage on NVM storage media. Embodiments of the system may include a non-transitory memory device, wherein modules of instruction code may be stored, and at least one processor associated with the memory device, and configured to execute the modules of instruction code. Upon execution of the modules of instruction code, the at least one processor may be configured to: receive, from at least one client computing device, one or more data write requests, associated with application metadata, to store one or more respective data objects on the NVM storage media; perform a first classification of the one or more data objects, based on the application metadata, to associate each data object to a group of data objects; store the data objects of each group in a dedicated storage set of a logical address space; and transmit the data objects of each storage set to be stored in a respective, dedicated range of the NVM storage media.

According to some embodiments of the invention, the at least one processor may be associated with a machine-learning (ML) based model, The ML-based model may be adapted to associate each data object to a group of data objects based on the GC metadata and/or application metadata.

According to some embodiments of the invention, the ML-based model may be a supervised ML-based model, trained to associate each data object to a group of data objects based on the GC metadata and application metadata. Training the ML-based classification model may be done based on performance feedback data of the NVM storage media, including for example, average read latency, tail read latency and write amplification.

Additionally, or alternatively, the ML-based model may be an ML-based clustering model, adapted to associate each data object to a group of data objects based on the GC metadata and/or application metadata, according to a best fit (e.g., K-means) algorithm.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
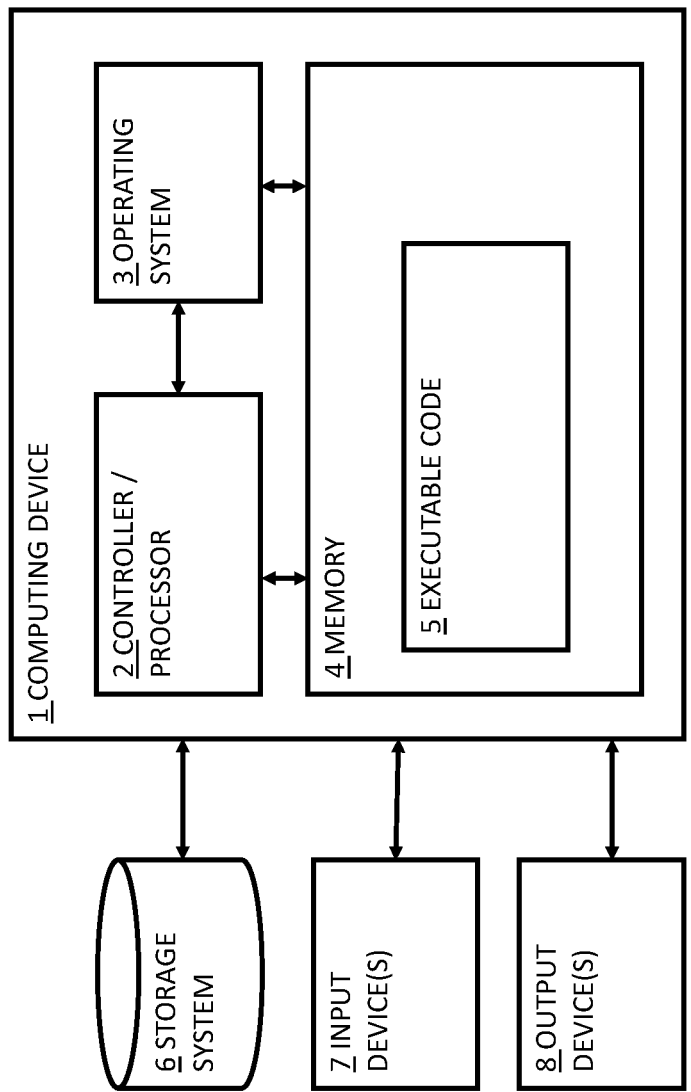
FIG. 1 is a block diagram depicting a computing device, which may be included within a system for managing NVM computer storage media, according to some embodiments of the invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE PRESENT INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention. Some features or elements described with respect to one embodiment may be combined with features or elements described with respect to other embodiments. For the sake of clarity, discussion of same or similar features or elements may not be repeated.

Although embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium that may store instructions to perform operations and/or processes. Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. The term set when used herein may include one or more items. Unless explicitly stated, the method embodiments described herein are not constrained to a particular order or sequence. Additionally, some of the described method embodiments or elements thereof can occur or be performed simultaneously, at the same point in time, or concurrently.

Reference is now made to FIG. 1, which is a block diagram depicting a computing device, which may be included within an embodiment of a system for managing NVM computer storage media, according to some embodiments.

Computing device 1 may include a processor or controller 2 that may be, for example, a central processing unit (CPU) processor, a chip or any suitable computing or computational device, an operating system 3, a memory 4, executable code 5, a storage system 6, input devices 7 and output devices 8. Processor 2 (or one or more controllers or processors, possibly across multiple units or devices) may be configured to carry out methods described herein, and/or to execute or act as the various modules, units, etc. More than one computing device 1 may be included in, and one or more computing devices 1 may act as the components of, a system according to embodiments of the invention.

Operating system 3 may be or may include any code segment (e.g., one similar to executable code 5 described herein) designed and/or configured to perform tasks involving coordination, scheduling, arbitration, supervising, controlling or otherwise managing operation of computing device 1, for example, scheduling execution of software programs or tasks or enabling software programs or other modules or units to communicate. Operating system 3 may be a commercial operating system. It will be noted that an operating system 3 may be an optional component, e.g., in some embodiments, a system may include a computing device that does not require or include an operating system 3.

Memory 4 may be or may include, for example, a Random Access Memory (RAM), a read only memory (ROM), a Dynamic RAM (DRAM), a Synchronous DRAM (SD-RAM), a double data rate (DDR) memory chip, a Flash memory, a volatile memory, a non-volatile memory, a cache memory, a buffer, a short term memory unit, a long term memory unit, or other suitable memory units or storage units. Memory 4 may be or may include a plurality of possibly different memory units. Memory 4 may be a computer or processor non-transitory readable medium, or a computer non-transitory storage medium, e.g., a RAM. In one embodiment, anon-transitory storage medium such as memory 4, a hard disk drive, another storage device, etc. may store instructions or code which when executed by a processor may cause the processor to carry out methods as described herein.

Executable code 5 may be any executable code, e.g., an application, a program, a process, task or script. Executable code 5 may be executed by processor or controller 2 possibly under control of operating system 3. For example, executable code 5 may be an application that may manage NVM computer storage media as further described herein. Although, for the sake of clarity, a single item of executable code 5 is shown in FIG. 1, a system according to some embodiments of the invention may include a plurality of executable code segments similar to executable code 5 that may be loaded into memory 4 and cause processor 2 to carry out methods described herein.

Storage system 6 may be or may include, for example, a flash memory as known in the art, a memory that is internal to, or embedded in, a micro controller or chip as known in the art, a hard disk drive, a CD-Recordable (CD-R) drive, a Blu-ray disk (BD), a universal serial bus (USB) device or other suitable removable and/or fixed storage unit. Data pertaining to storage of data objects on NVM media may be stored in storage system 6 and may be loaded from storage system 6 into memory 4 where it may be processed by processor or controller 2. In some embodiments, some of the components shown in FIG. 1 may be omitted. For example, memory 4 may be a non-volatile memory having the storage capacity of storage system 6. Accordingly, although shown as a separate component, storage system 6 may be embedded or included in memory 4.

Input devices 7 may be or may include any suitable input devices, components or systems, e.g., a detachable keyboard or keypad, a mouse and the like. Output devices 8 may include one or more (possibly detachable) displays or monitors, speakers and/or any other suitable output devices. Any applicable input/output (I/O) devices may be connected to Computing device 1 as shown by blocks 7 and 8. For example, a wired or wireless network interface card (NIC), a universal serial bus (USB) device or external hard drive may be included in input devices 7 and/or output devices 8. It will be recognized that any suitable number of input devices 7 and output device 8 may be operatively connected to Computing device 1 as shown by blocks 7 and 8.

A system according to some embodiments of the invention may include components such as, but not limited to, a plurality of central processing units (CPU) or any other suitable multi-purpose or specific processors or controllers (e.g., similar to element 2), a plurality of input units, a plurality of output units, a plurality of memory units, and a plurality of storage units.

The terms "NVM device" and "NVM storage unit" may be used herein interchangeably to refer to a single device, such as a Flash storage device, a solid-state storage device (SSD) or the like, that may, or may not be managed by an NVM controller.

The term "NVM media" may be used herein to refer to one or more NVM devices, that may be managed by a single NVM controller, or not managed by an NVM controller, or managed by a plurality of NVM controllers.

Figure 2:
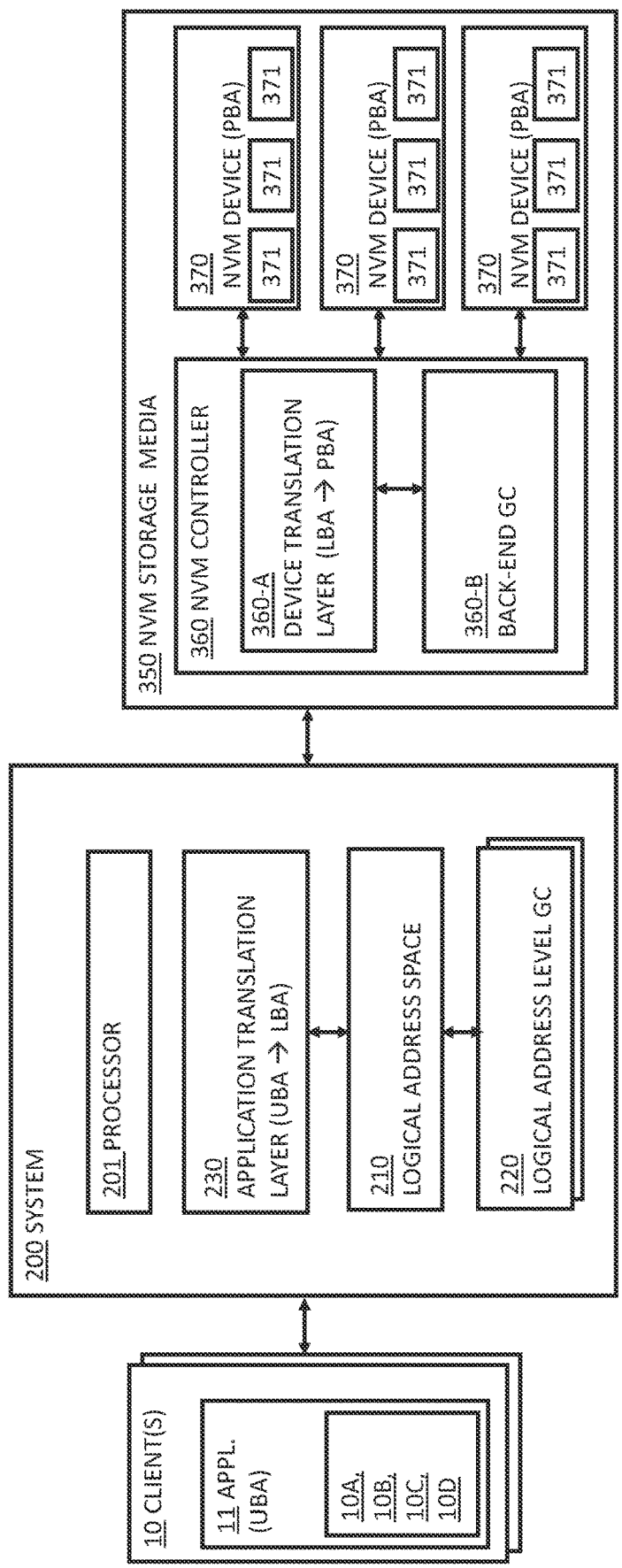
FIG. 2 is a schematic block diagram depicting a system for managing NVM computer storage media, according to embodiments of the invention.

Reference is made now to FIG. 2, which is a schematic block diagram depicting a system 200 for managing NVM computer storage media 350, according to some embodiments of the invention.

According to some embodiments, system 200 may be implemented by hardware, by software or any combination thereof. For example, system 200 may be, or may include a computing device such as computing device 1 of FIG. 1. System 200 may include a non-transitory memory device (e.g., memory 4 of FIG. 1) storing instruction code for management of storage on NVM media, as elaborated herein. System 200 may further include a processor 201, such as processor 2 of FIG. 1, that may be associated with memory device 4. Processor 201 may be configured to execute the instruction code, to implement one or more methods of management of storage on NVM media, as elaborated herein.

According to some embodiments, system 200 may be or may include a storage server, and may be adapted to, inter alia, perform actions of a storage server as known in the art, in addition to implementing methods of management of data storage on NVM storage media 350, according to embodiments of the present invention.

According to some embodiments, system 200 may be communicatively connected via a computer network (e.g., the Internet) to one or more client devices or computers 10 such as computing device 1 of FIG. 1.

Additionally, system 200 may be communicatively connected, or associated with one or more NVM storage devices 370 in an NVM storage media 350, e.g., via a Peripheral Component Interconnect Express (PCIE) bus. In some embodiments system 200 may be connected to one or more client computers 10 via means other than the Internet and to NVM storage media 350 via means other than a PCIE bus, as known in the art.

In another example, system 200 may be communicatively connected to a plurality of NVM storage media devices 370 through a port switch, configured to route data objects between system 200 and at least one port of at least one NVM storage media device 370 of the plurality of NVM devices.

According to some embodiments, system 200 may receive, from the one or more client devices or computers 10, one or more data access requests 10A (e.g., data write requests, data read requests, delete requests, move requests, etc.), to access one or more NVM storage devices 370 of NVM storage media 350. System 200 may be adapted to handle each data request 10A as a storage server, e.g., by writing, reading, delete or moving data on storage media 350. Additionally, system 200 may be adapted to implement one or more methods of managing storage on NVM storage media, as elaborated herein.

According to some embodiments of the invention, system 200 may receive from at least one client computing device 10, one or more data write requests 10A, each associated with application metadata 10C (e.g. including data describing the underlying or associated data), to store one or more respective data objects 10B on the NVM storage media 350. For example, a data write request 10A may pertain to a request to store one or more data objects 10B, and may include metadata 10C (e.g., name, size, time of arrival, etc.) that describes the underlying one or more data objects 10B.

According to some embodiments, application metadata 10C may include, for example, a range of addresses, such as a virtual application address range 10D of data object 10B. Virtual address range 10D may include, for example one or more fixed-sized user data blocks, represented as UBAs.

Additionally, or alternatively, application metadata 10C may include a size (e.g., in Bytes, in data blocks etc.) of data object 10B, and/or a timestamp indicating a time of reception of a data access request (e.g., data write request) 10A that included data object 10B.

Additionally, or alternatively, application metadata 10C may include one or more application-level block addresses (e.g., UBAs) that pertain to a specific data access request 10A.

Additionally, or alternatively, application metadata 10C may include one or more logical-level block addresses (e.g., LBAs) that pertain to a specific data access request 10A.

Additionally, or alternatively, application metadata 10C may include an identification of a namespace (e.g., a file name) to which data object 10B pertains, an identification of an application 11 to which data object 10B pertains, an identification of a client computing device 10 to which data object 10B pertains.

Additionally, or alternatively, application metadata 10C may include an identification of a data stream (e.g., a stream ID) to which data object 10B pertains and/or an identification of a working set (e.g., a group of data objects that are typically read or written together) to which data object 10B pertains.

As elaborated herein, system 200 may classify the incoming data objects 10B to enable association of two or more different data objects 10B with one another, to form groups of data objects 10B, based on similarity of their classification. System 200 may subsequently store data objects 10B with the same or similar classification in dedicated storage sets of a logical address space 210. Logical address space 210 may be implemented, for example by a memory device such as memory 4 of FIG. 1. The term "dedicated" may be used in this context to indicate that data objects 10B that are members in specific groups or classes are stored and maintained in respective, specific regions of logical address space 210, and where each such region of logical address space 210 corresponds to a specific group or class of data objects 10B.

As elaborated herein, the classification of data objects 10B may include an initial, a-priori stage, where data objects 10B may be initially grouped or classified based on application metadata 10C (e.g., metadata associated with, or included in a write access request 10A from an application 11 that may be executed on a client device 10), as elaborated herein. System 200 may utilize this a-priori classification in order to assign or associate a specific range of logical block addresses in the logical address space 210, based on the similarity or equality of different characteristics of written data objects 10B as identified or determined during the classification. Such range of logical block addresses may be referred to herein as storage sets, or logical storage sets.

As elaborated herein, system 200 may perform separately, for each of the storage sets, a process of garbage collection on the logical address level 210, by a dedicated GC mechanism or module. System may utilize the dedicated GC mechanisms to accumulate GC related metadata pertaining to one or more data objects 10B, and perform a second, a posteriori, persistent stage of classification of the data objects 10B, based on the accumulated GC metadata.

The term "persistent" may be used in this context to indicate an ongoing, or iterative process of continuous refinement of data object classification, based on GC metadata that may accumulate over time. During this second, a posteriori stage of classification, system 200 may move a data object 10B from a first group, associated with a first storage set, to a second group, associated with a second storage set.

As elaborated herein, system 200 may subsequently store data objects 10B pertaining to specific storage sets on separate, dedicated address ranges 371 of underlying NVM storage media 350. The term "range" may be used in this context to indicate a region of NVM storage media 350, represented by a scope or group of consecutive physical block addresses. The term "dedicated" may be used in this context to indicate that each specific storage set 211 may correspond to a specific, dedicated location or address range 371 of physical storage in NVM media 350. In other words, system 200 may maintain similar data objects in dedicated regions of NVM storage media 350. For example, system 200 may store data objects 10B that are frequently updated in a separate storage region or storage device than data objects 10B that are infrequently updated. Thus, system 200 may reduce GC-related data writes, optimize NVM media write amplification, enhance the NVM devices' durability and improve storage latency.

According to some embodiments, client computer 10 may execute or implement an application 11 that may write a data object 10B (e.g., a namespace, a volume, a variable, a data structure, a file, an entry in a database, etc.) to an NVM device 370. Application 11 may produce a data access request 10A that may include, or associate data object 10B with a virtual address of the application's address space. The virtual address may include, for example, (a) a namespace, which can be thought of as a virtual hard drive, and (b) a virtual user block address (UBA), which may be an offset from the namespace within the application address space. In other words, data access request 10A may include one or more data objects 10B, that may be addressed in a virtual application address space, including one or more fixed-sized user data blocks, represented as UBAs.

According to some embodiments of the invention, system 200 may include an application translation layer 230, adapted to arrange the data objects written by an application in logical address space 210. According to some embodiments, logical address space 210 may employ a linear addressing scheme, where blocks of data located by a logical block address (LBA) index. For example, the first logical block may begin in address LBA-0, the second in LBA-1, etc.

According to some embodiments of the invention, system 200 may interface at least one NVM controller 360 of NVM storage media 350 using logical address space 210. In other words, translation layer 230 of system 200 may translate data write request 10A to include one or more LBA addresses, and system 200 may transmit the translated data write request to an NVM controller 360 of NVM storage media 350.

NVM controller 360 may be adapted to address at least one NVM device 370 of NVM storage media 350, to store the data object in any physical address, on one or more physical block addresses (PBAs), on the at least one NVM device 370.

NVM controller 360 may include, or may implement a device translation layer 360-A, to maintain an association of each data object's 10B logical address, that may be represented by one or more LBAs, with the physical location (e.g., represented by one or more PBAs) of storage of the data object 10B on the at least one NVM device 370.

According to some embodiments, NVM controller 360 may include or implement a back-end or hardware level GC module 360-B, adapted to perform GC on a physical block address level. Back-end GC module 360-B may move the location of storage of data objects 10B within the physical storage address space, and device translation layer 360-A may maintain the association of each data object's 10B logical address (represented as LBAs) with the physical address on the NVM device (represented as PBAs).

Figure 3:
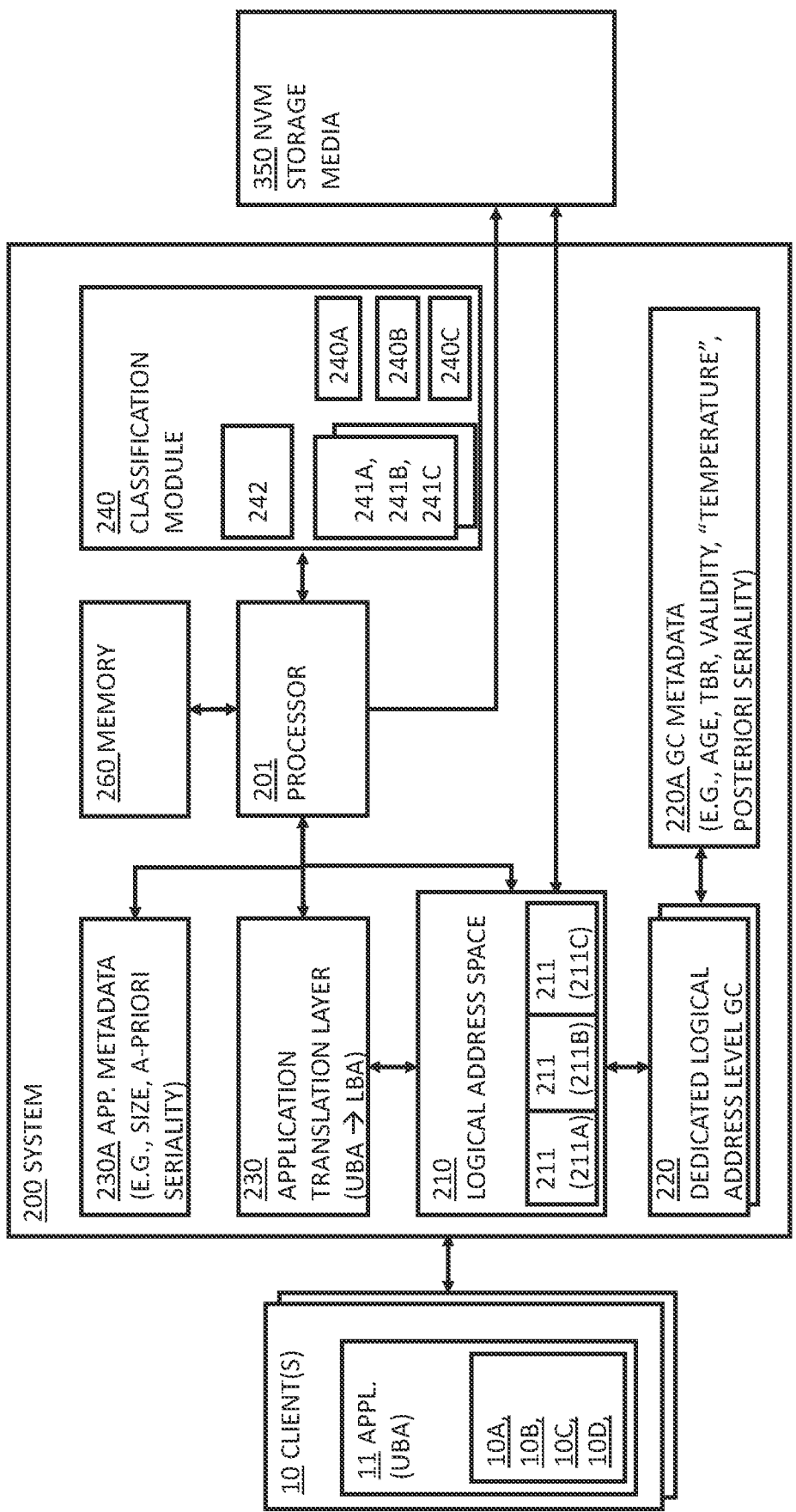
FIG. 3 is a schematic block diagram depicting a system for managing NVM computer storage media, according to embodiments of the invention.

Reference is now made to FIG. 3, which is a block diagram depicting system 200, for managing storage on NVM storage media 350, according to some embodiments of the invention.

System 200 may be adapted to provide a single point of control for managing the address translation and GC processes between one or more applications 110 running or executing on one or more client computers 10, and at least one NVM storage device 370.

According to some embodiments, system 200 may include a classification module 240, adapted to classify or group one or more data objects 10B and/or one or more applications 11, into a plurality of classes or groups 240A, as elaborated herein. The terms "classification" and "grouping", may be used herein interchangeably to indicate this operation of classification module 240. Accordingly, the terms "classes" and "groups" may be used herein interchangeably, to indicate the product of classification module 240.

According to some embodiments, system 200 may be configured to receive from one or more data access requests 10A, application metadata 10C that pertains to a data object 10B, of an application 11 that may be executed on client computing device 10.

According to some embodiments, processor 201 may be adapted to extract application metadata 10C from the one or more data access requests 10A, and may store the extracted application metadata locally (e.g., in memory device 4 of FIG. 1). The extracted application metadata is denoted as element 230A of FIG. 3. In other words, application metadata 230A may include the content of application metadata 10C, as elaborated herein.

Additionally, or alternatively, processor 201 may analyze application metadata 10C, and further include outcome of this analysis in application metadata 230A, as elaborated herein.

According to some embodiments, classification module 240 may be adapted to perform an initial, or a-priori classification or grouping of the one or more data objects 10B, according to application metadata 230A, so as to associate each data object to a group of data objects 240A, as elaborated herein. In some embodiments, classification module 240 may perform the a-priori classification on an incoming data object 10B of data access request 10A, based on the relevant data object's size and/or seriality, as elaborated herein. The term "a-priori" may be used in this context to indicate that data object 10B may be initially classified as it arrives with data access request 10A, without taking into account historical information that may be accumulated over time, as elaborated herein.

For example, as elaborated herein, application metadata 10C, may include a virtual application address range 10D of data object 10B. Virtual address range 10D may include one or more fixed-sized user data blocks, represented as UBAs. Processor 201 may extract this virtual address range 10D, and include it in application metadata 230A. Processor 201 may then calculate a size value (e.g., in Bytes, in blocks, etc.) of one or more data objects 10B, based on the virtual address range 10D. Processor 201 may then store the calculated size value of data object 10B as part of application metadata 230A.

Classification module 240 may classify data object 10B according to the size value. In other words, classification module 240 may analyze the size value application metadata 230A to determine whether a data object 10B requires a large number of physical storage blocks or pages, and therefore may be classified by classification module 240 as 'big write', or whether that data object 10B requires a relatively small number physical storage blocks or pages, and therefore may be a-priori classified by classification module 240 as 'small write'. Classification module 240 may subsequently classify, or associate one or more object 10B to classes or groups 240A, according to this analysis.

According to some embodiments, classification module 240 may compare the size value of data object 10B (in application metadata 230A) to one or more size threshold values, so as to classify the relevant data object 10B according to its size (e.g., as "big write", "medium write" and "small write"). For example, the one or more size threshold values may be defined as different numbers of LBA blocks, that are required for the storage of data object 10B on logical address space 210. For example, data objects classified as "big write" may require a first logical address space that may require more LBAs than a second logical address space required for storage of data objects classified as "small write".

According to some embodiments, the one or more groups or classes 240A may each be associated with a corresponding range size, defined between a first size threshold value (e.g., a lower limit) and a second size threshold value (e.g., an upper limit). A computed data object size value may be compared to size threshold values that limit the range of size that pertain to one or more groups or classes 240A. Subsequently, the relevant data object 10B may be associated with a specific group if the computed data object size value is between the lower limit and the upper limit.

Additionally, or alternatively, classification module 240 may be adapted to compute an a-priori value of seriality for at least one data object 10B, based on application metadata 230A, as elaborated herein. Classification module 240 may then further a-priori classify or group data objects 10B to one or more groups 240A based on the computed a-priori seriality value.

As elaborated herein, virtual address range 10D (included in application metadata 230A) may include one or more fixed-sized user data blocks, that may be represented as one or more UBAs. According to some embodiments, classification module 240 may further perform a-priori classification of data objects 10B, according to the a-priori seriality value.

For example, classification module 240 may a-priori classify a data object 10B as "serial", if: (a) the computed size value exceeds a predefined size threshold, and (b) the virtual address range 10D where the relevant data object resides is smaller than a predefined seriality threshold. In other words, classification module 240 may a-priori classify a data object 10B as "serial" when it is large enough, and concentrated enough (e.g., without gaps) within virtual address range 10D of data access request 10A.

In a complementary manner, classification module 240 may a-priori classify a data object 10B as "random" if: (a) the computed size value is beneath the predefined size threshold, or (b) the virtual address range 10D where the relevant data object 10B resides is larger than the predefined seriality threshold. In other words, classification module 240 may a-priori classify a data object 10B as "random" when it is too small, or when it is represented by a virtual address range 10D that includes many gaps.

According to some embodiments, classification module 240 may perform the a-priori classification of data objects 10B according to the a-priori seriality value, to produce a plurality of groups 240A, where each group corresponds to a specific range of seriality values. For example classification module 240 may: (a) produce the a-priori seriality value of a data object 10B as a function (e.g., a ratio) of the size value of data object 10B and the size of virtual address range 10D, and (b) compare the a-priori seriality value to one or more seriality threshold values, so as to a-priori classify or group data objects into a plurality of groups 240A.

Additionally, or alternatively, classification module 240 may perform the a-priori classification of data objects 10B according to the a-priori seriality value and size value, to produce a plurality groups 240A, where each group corresponds to similar values (e.g., within a range) of both a-priori seriality value and size value.

According to some embodiments, processor 201 may assign each group or class 240A of data objects 10B to a different, dedicated storage set 211 or range in logical address space 210. In other words, processor 201 may arrange the content of logical address space 210 such that data objects 10B pertaining to the same group or class (e.g., having a similar data object 10B size value and/or seriality value) may be stored or maintained in dedicated, separate regions or storage sets 211 of logical address space 210.

According to some embodiments, system 200 may transmit, move or copy the content of data objects 10B, that is stored on one or more (e.g., each) storage set 211 of logical address space 210 to one or more respective, dedicated ranges or locations 371 on NVM storage devices 370 of NVM storage media 350. Thus, system 200 may implement separate storage of data objects 10B on NVM media 350, according to the classification or grouping of data objects 10B.

According to some embodiments, or alternatively, processor 201 may assign a dedicated logical address level GC mechanism or module 220 (denoted herein as simply "GC module 220") for each storage set 211 (associated with a specific group or class 240A). Dedicated GC module 220, may be adapted to perform a dedicated, LBA-level garbage collection process of data objects in that storage set 211 of logical address space 210. In other words, dedicated GC mechanism may perform, within the respective storage set, a dedicated GC process on data objects 10B that are stored or maintained in that respective storage set.

The term "dedicated" may be used in this context to indicate that the GC process performed by GC module 220 may not transfer or relocate data objects from a first storage set 211 (e.g., 211A), associated with a first group 240A, to a second storage set 211 (e.g., 211B), associated with a second group 240A.

According to some embodiments, dedicated GC module 220 may be adapted to obtain GC metadata 220A pertaining to one or more (e.g., each) data object that is stored in the respective storage set 211 in the logical address space 210. Classification module 240 may subsequently use GC metadata 220A perform a second, a posteriori classification of data objects 10B. Additionally, classification module 240 may modify, update or fine-tune the classification or grouping of one or more data objects 10B into groups 240A, based on GC metadata 220A, as elaborated herein.

In other words, during a second, a posteriori classification of data objects 10B, classification module 240 may update an association of a data object 10B, from a first group to a second group, or move one or more data objects 10B from a first group or class 240A to a second group or class 240A, according to the GC metadata 220A. Subsequently, processor 201 may reallocate or move the relevant one or more data objects 10B from a first storage set 211, associated with the first group 240A to a second storage set 211, associated with the second group 240A. Finally, system 200 may transmit or move the content of the second storage set into a range of the NVM storage media 350 that is dedicated to the second storage set 211. Thus, system 200 may dynamically update a location of storage of a data object 10B on NVM storage media 350, according to GC metadata that may be accumulated over time. The term "a posteriori" may be used in this context to indicate classification that may be performed after the data object 10B has been received in system 200, and based on historical data pertaining to data object 10B that has been accumulated.

As elaborated herein, dedicated GC module 220 may be configured to perform GC on a specific storage set 211 of logical address space 210, which is associated with a specific group 240A of data objects 10B. According to some embodiments, each time a dedicated GC process is performed (e.g., each time that data within a storage set 211 is relocated), GC module 220 may obtain or update GC metadata 220A pertaining to data objects 10B of the respective storage set 211.

According to some embodiments, GC metadata 220A may include, for example, an "age" value of data object, e.g., a period of time that has elapsed from an initial reception of data object 10B from client 20, to be written into NVM storage media 350. GC module 220 may, for example, update the age value of data object 10B each time it is relocated by the GC process.

Additionally, or alternatively, GC metadata 220A may include a validity status value (e.g., "valid" or "invalid"), pertaining to a data object 10B or a portion thereof. The validity status may indicate whether a newer version of data object 10B and/or of a portion of data object 10B has been received from one or more clients 20.

Additionally, or alternatively, GC module 220 may calculate, as part of a GC metadata 220A, a "time between rewrites" (TBR) value. The TBR value may represent a duration of time that has elapsed between a first write (or rewrite) of data object 10B and a second, subsequent rewrite of the same data object 10B. In some embodiments TBR may be a statistical representation of time that has elapsed between consecutive writes of the same data object 10B. For example, TBR may be or may include a calculated mean or average value of time, that has elapsed between a plurality consecutive rewrite events.

As elaborated herein, (e.g., in relation to FIG. 5B) classification module 240 may utilize GC metadata 220A, to perform the a posteriori classification, so as to refine or update the grouping or classification of data objects 10B into groups 240A, in a repetitive, or continuous manner. Subsequently, processor 201 may repeatedly update or modify the association of data objects 10B to storage sets 211 on the logical address space. This process of update may be iterative, or repetitive, in a sense that it may be triggered, for example, by (a) an external event, such as reception of a data access request 10A, (b) an internal event, such as performance of a dedicated GC process by GC module 220, and/or (c) a synchronous event, such as a process of processor 201, a scheduled timer event, and the like.

According to some embodiments, classification module 240 may perform the a posteriori classification process based on the calculated TBR value; Classification module 240 may continuously monitor write and rewrite actions 10A on NVM storage media 350 and repeatedly or continuously calculate a TBR value pertaining to one or more incoming data object 10B. Classification module 240 may then compare the computed TBR value to one or more TBR threshold values, and may subsequently update the association of data object 10B, from a first group 240A to a second group 240A, based on this comparison.

For example, classification module 240 may label a data object 10B by a "temperature" (e.g., "hot", "warm", "cold") label, based on the comparison of the computed TBR value to the one or more TBR threshold values. Classification module 240 may then classify or group data objects 10B according to the "temperature" label. The term "temperature" may be used in this context to indicate whether a data object 10B is often updated or rewritten (e.g., beyond a predetermined TBR threshold), and may thus be related to as "hot", or whether data object 10B is seldom rewritten (e.g., beneath a predetermined threshold), and may thus be related to as "cold". Classification module 240 may then classify or group data objects 10B to one or more groups 240A based on their computed "temperature" label (e.g., "hot", "warm" or "cold").

Additionally, processor 201 may maintain the "temperature" labels (e.g., "hot", "cold") of each data object 10B as part of GC metadata 220A, and classification module 240 may perform the a posteriori classification further based on historic "temperature" label values.

For example, a current TBR value of data object 10B, may be beneath a TBR threshold, indicating that data object 10B is now "hot", whereas one or more historic "temperature" label values of data object 10B may be "cold". Classification module 240 may calculate a weighted sum of the current label value and the one or more historic label values to determine a new, updated value for the "temperature" label. Classification module 240 may then classify or group data object 10B to one or more groups 240A based the updated "temperature" label (e.g., "hot", "warm" or "cold").

According to some embodiments, one or more (e.g., each) storage set may have, or may be associated with one or more specific values of TBR thresholds. For example, storage sets that are associated with groups 240A of a large size value may be associated with one or more first TBR threshold values, and storage sets that are associated with groups 240A of a small size value may be associated with one or more second, smaller TBR threshold values.

According to some embodiments, classification module 240 may perform an a posteriori classification of one or more data objects 10B by computing a posteriori seriality value of the one or more data objects 10B, based on GC metadata 220A as elaborated herein. Classification module 240 may then perform the a posteriori classification based on the a posteriori seriality value.

According to some examples, classification module 240 may verify that data object 10B is stored within a range of the logical address space 210 (e.g., with, or without gaps) to discern whether the data object is serial, and may label data object 10B as "serial" or "random" accordingly.

For example, as elaborated herein, data objects 10B may be rewritten or updated over time. This may result in storage of data pertaining to multiple versions of data objects 10B on logical address space 210, where a portion of the stored data may be labeled (e.g., by processor 201 or by application translation layer 230) as "invalid". The validity value, e.g., the labeling of data elements (e.g., data blocks) as "valid" or "invalid" may be stored as part of GC metadata 220A. Dedicated GC module 220 may utilize the validity GC metadata 220A to perform GC on storage sets 211 of the logical address space 210. Classification module 240 may receive (e.g., from dedicated GC module 220) the validity GC metadata 220A and examine the validity label of blocks or pages pertaining to one or more data objects: If the entire range of LBAs that stores or includes data object 10B is labeled "valid", then the associated data object 10B may be labeled serial. If, however, at least a portion of the range of LBAs that includes storage of data object 10B is labeled invalid, the associated data object 10B may be labeled as random. The exemplary process elaborated above may provide a hard, binary value of seriality or randomness to the a posteriori seriality of data object 10B. It may be appreciated, however, that additional forms of soft decision may produce multiple levels of "seriality" or "randomness" for the a posteriori seriality value.

Additionally, or alternatively, classification module 240 may analyze the range of LBAs that stores or includes data object 10B, and assign an a posteriori seriality value according to the analysis. For example, classification module 240 may calculate the seriality value as a function (e.g., a ratio) between the size of data object 10B and the size of a range of LBAs that includes data object 10B, and may assign the a posteriori seriality value to the relevant data object 10B accordingly. For example, a low ratio (e.g., 0.1) may indicate a sparsely stored data object 10B, resulting in a low a posteriori seriality value, whereas a high ratio (e.g., 0.9) may indicate a densely stored data object 10B, and may thus result in a high a posteriori seriality value. In this example, the seriality value may be a number between 0 and 1.

Additionally, or alternatively, classification module 240 may perform the a posteriori classification of one or more data objects 10B, based on a combination of the a-priori seriality value and the a posteriori seriality value. For example, classification module 240 may accumulate historical data pertaining to at least one data object 10B, such as an a-priori seriality value, and/or one or more historic a posteriori seriality values. Classification module 240 may then apply a mathematical function (e.g., a weighted sum) on the accumulated historical data, to produce a new a posteriori seriality value of data object 10B. Classification module 240 may subsequently compare the new a posteriori seriality value to one or more predefined seriality values to classify, or assign data object 10B into a group 240A.

According to some embodiments, classification module 240 may be configured to classify or group data objects 10B according to one or more predefined classification criteria 240B, and may for example, use a decision tree mechanism and/or a machine learning (ML) based algorithm to facilitate the classification, as elaborated herein. The classification criteria may include, for example, one or more elements of application metadata 230A as elaborated herein (e.g., size value, a-priori seriality, etc.) Additionally, or alternatively, the classification criteria may include, for example, one or more elements of GC metadata 220A as elaborated herein (e.g., age, TBR, validity, temperature, a posteriori seriality value, etc.).

According to some embodiments, for denoting classification relating to more than one classification criterion 240B of a classified data object 10B, classification state vectors 240C may be used. For example, in order to denote a classification state of a data object 10B that is classified with respect to two different features (e.g., data object size and "temperature") a dual-element vector 240C may be used, where a first numerical value may denote the classification state 240B of the data object with regard to big write/small write classification, and a second numerical value may denote the classification state 240B of the data object with regard to the "temperature" data classification.

Additionally, or alternatively, groups 240A may not be mutually exclusive between different classification criteria 240B. In other words, classification module 240 may classify data objects 10B according to groups 240A, where each group includes a representation of a plurality classification features (e.g., "temperature", object size value, a-priori seriality, and/or a posteriori seriality).

According to some embodiments, classification module 240 may be or may include a machine-learning (ML) based classification model 241A, associated with processor 201. In other words, ML based model 241A may be adapted to associate each data object 10B to a group of data objects 240A based on the GC metadata 220A and/or application metadata 230A.

According to some embodiments, ML-based classification model 241A may be an ML-based clustering model, adapted to associate each data object to a group of data objects based on the GC metadata and application metadata according to a best fit algorithm. For example, classification module 240 may group, classify or cluster data objects 10B into groups according to a non-supervised best-fit clustering algorithm such as a K-means algorithm, as known in the art.

Additionally, or alternatively, classification module 240 may be, or may include an ML-based classification model 241B, adapted to group, or classify data objects 10B into groups according to a supervised classification algorithm, as known in the art. In other words, ML-based model 241A may be a supervised ML-based model, trained to associate each data object 10B to a group of data objects 240A based on GC metadata 220A and/or application metadata 230A. ML-based classification model 241B may be trained based on performance feedback data 242 of the NVM storage media, such as average read latency, tail read latency and write amplification.

For example, ML classification model 240B may receive (e.g., via input device 7 of FIG. 1 and/or from NVM controller 360, via processor 201) one or more feedback data elements 242 pertaining to performance of an underlying NVM storage device 370. Feedback data elements 242 may include, for example, a value of write amplification, an average read latency, a tail read latency, and the like. Processor 201 may train classification model 240B, using the one or more performance feedback data elements 242 as supervisory data for ML-based classification model 241B, to produce an optimal set of groups 240A. The term "optimal" may be used in this context in a sense of providing the best performance of the underlying NVM storage device(s) 370, in view of the one or more performance feedback data elements 242

Additionally, or alternatively, classification module 240 may be implemented according to a decision-tree logic 241C. For example, decision-tree logic 241C may classify one or more data objects 10B to groups 240A, according to at least one classification criterion 240B, and based on one or more data elements of application metadata 230A (e.g., size value, a-priori seriality, etc.) and/or GC metadata 220A (e.g., age, TBR, validity, temperature, a posteriori seriality value, etc.), as elaborated herein.

Figure 4:
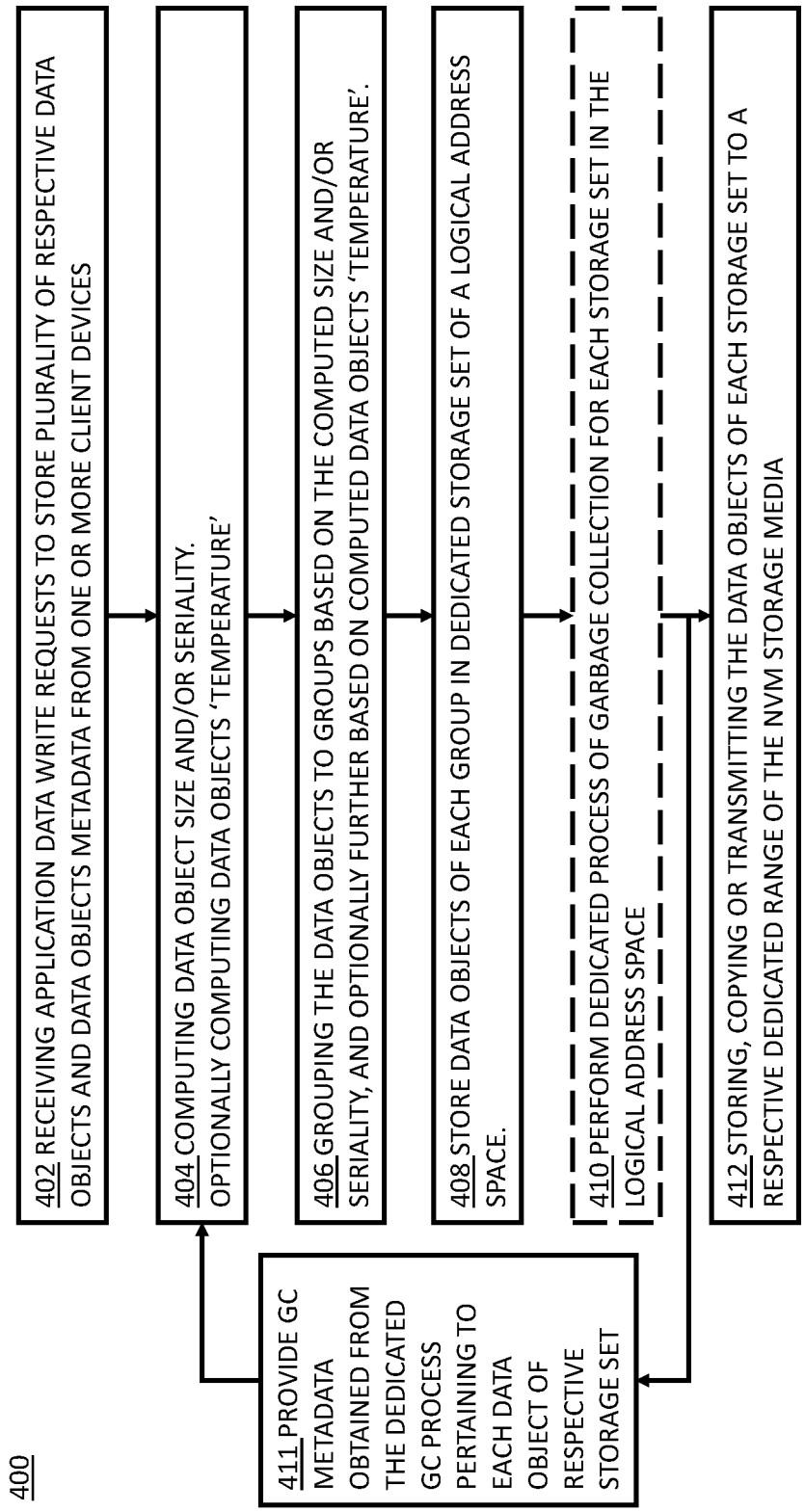
FIG. 4 is a flow diagram depicting a method of managing data storage on non-volatile memory storage media, according to embodiments of the invention.

Reference is now made to FIG. 4, which is a flow diagram depicting a method 400 of managing data storage on non-volatile memory storage media 350 by at least one processor, according to embodiments of the invention.

According to some embodiments, steps of method 400 may be implemented via appropriate program code that may be executed by processor 201 of system 200. The goal of a classification process performed as part of the flow diagram 400 may follow the definition discussed above that seeks to: (a) identify features (e.g., "temperature", seriality and/or size) of data objects 10B; (b) associate data objects with similar or equal features to groups 240A according to the features; (c) store each group 240A in a dedicated storage set 211 of a logical address space 210; and (d) transmit or move the content of each storage set in the logical address space to be stored in a separate, dedicated storage range 371 in the underlying NVM storage media.

It may be appreciated by a person skilled in the art that the storage of data objects 10B having similar characteristics or features (e.g., characteristics of "temperature", seriality and/or size) together in dedicated regions or ranges 371 of the NVM storage media 350 may minimize the number of GC-related writes, and thus improve the NVM device's durability and read/write latency. For example, it may be appreciated that storing "cold" data objects 10B separate from "hot" data objects may prevent relocation of "cold" data due to invalidation of "hot" data. The term "separate" may be used in this context to indicate, for example storage in separate, different regions 371 of a storage device 370, or even on a different storage device 370 altogether. In another example, it may be appreciated that storing "serial" data objects 10B separate (e.g., in separate, dedicated storage regions 371) from "random" data objects 10B may prevent relocation of "serial" data objects 10B due to garbage collection of portions of "random" data objects 10B. In yet another example, it may be appreciated that storing large data objects 10B separate (e.g., in separate, dedicated storage regions 371) from small data objects 10B may prevent rewriting of small data objects 10B due to relocation (e.g., by garbage collection) of large data objects 10B.

It may also be appreciated by a person skilled in the art that in addition to the benefits elaborated above, embodiments of the invention may minimize the relocation of data objects by the back-end GC process 360-B of FIG. 2. This is because dedicated GC mechanism 220 of FIG. 3 may handle collection of garbage in the logical address space 210 level, and may thus render at least a portion of garbage collection in the physical level, by back-end GC 360-B, redundant.

As shown in step 402, system 200 may receive from one or more computing devices (e.g., client devices 10 of FIG. 2) one or more (e.g., a plurality) of application data access requests 10A. The plurality of data access requests 10A may be or may include data write requests from one or more applications 11, for storing one or more (e.g., a plurality) of data objects 10B on NVM storage media 350.

Data access requests 10A may include, or may be associated with application metadata 10C, which may be also included in application metadata 230A, as elaborated herein (e.g., in relation to FIG. 3). According to some embodiments, the one or more application data objects 10B may temporarily be stored on a memory device such as memory device 260 of FIG. 3.

As shown in step 404, system 200 may initially, or a-priori compute, e.g., by processor 201, values of size (e.g., in Bytes) and/or seriality of the received one or more data objects 10B of the plurality of data objects 10B. According to some embodiments processor 201 may calculate the size and seriality values based on application metadata 230A as elaborated herein (e.g., in relation to FIG. 5A). Additionally, or alternatively, processor 201 may calculate a value of "temperature" based on application metadata 230A and/or GC metadata 220A, as elaborated herein.

As shown in step 406, system 200 may initially classify (e.g., by classification module 240 of FIG. 3) the data objects 10B to groups based on the computed seriality values as computed in step 404. Additionally, or alternatively, system 200 may classify or group the data objects 10B further based on the data object size values, as computed in step 404. Additionally, or alternatively, system 200 may classify the data objects to groups further based on the calculated value of the data object "temperature".

As shown in step 408, the system 200 may store the content of each group of classified data objects in a dedicated, separate storage set 211 (e.g., 211A, 211B, 211C) of logical address space 210. As elaborated herein, logical address space 210 may be implemented, for example by a memory device such as memory 4 of FIG. 1.

As shown in step 412, system 200 may transmit data blocks that were stored in dedicated storage sets 211 (e.g., 211A, 211B, 211C) of logical address space 210 to NVM storage media 350, to store data objects 10B in respective, separate, dedicated ranges 371 of NVM storage media 350.

As shown in step 410, when needed, a dedicated GC process may be performed separately for each storage set 211 in the logical address space 210, e.g., by a dedicated GC mechanism or module 220. dedicated GC module 220 may obtain, in each iteration of garbage collection, GC related metadata 220A pertaining to one or more data objects 10B, as elaborated herein (e.g., in relation to FIG. 3).

As shown in step 411 classification module 240 may consider GC metadata 220A obtained from the dedicated GC process of GC module 220 (performed in block 410) at block 404 for further computing the "temperature" and/or seriality of data blocks of the one or more data objects 10B.

As indicated above, during the process of determination of classification state values of data objects, decision trees may be used.

Figure 5:
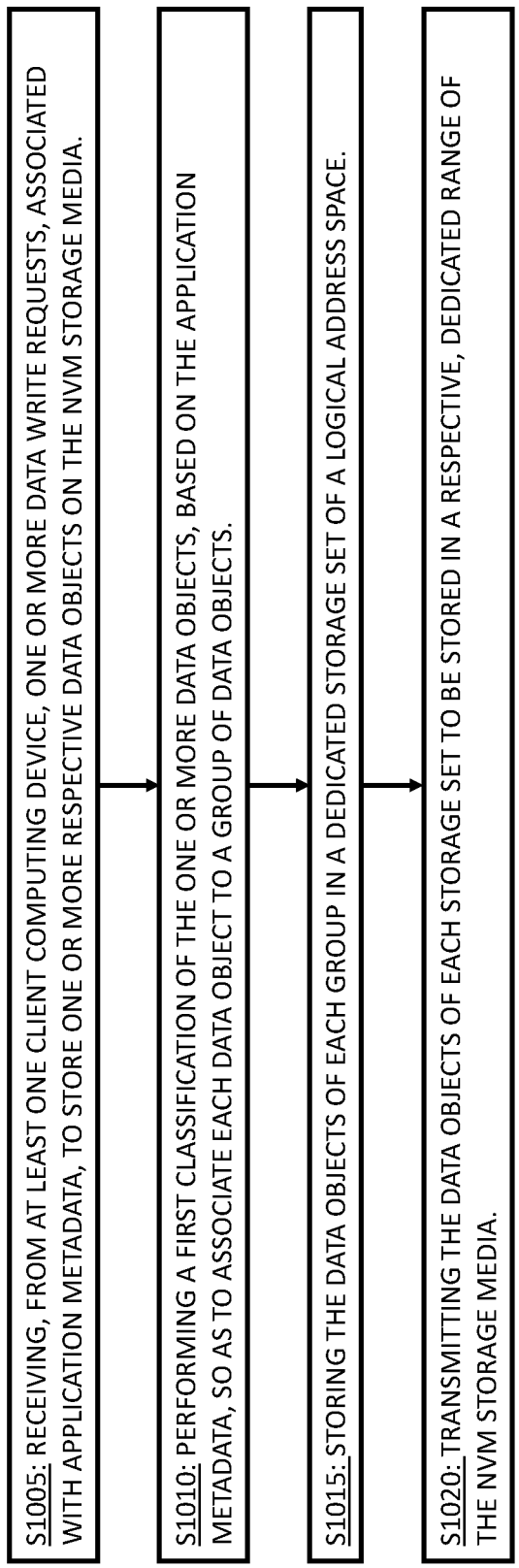
FIG. 5 is a flow diagram depicting another method of managing data storage on non-volatile memory storage media, according to embodiments of the invention.

Reference is now made to FIG. 5, which is a flow diagram depicting a method of managing data storage on non-volatile memory storage media by at least one processor, according to embodiments of the invention.

As shown is step S1005, the at least one processor (e.g., processor 201 of FIG. 3) may receive, e.g., from at least one client computing device (e.g., client 10 of FIG. 2), one or more data write requests (e.g., element 10A of FIG. 2) to store one or more respective data objects (e.g., element 10B of FIG. 2) on NVM storage media 350. The one or more data write requests 10A may be associated with application metadata 10C representing information pertaining to data objects 10B, as elaborated herein (e.g., in relation to FIG. 2).

As shown is step S1010, the at least one processor 201 may perform a classification of the one or more data objects, based on the application metadata, so as to associate each data object 10B to a group of data objects (e.g., element 240A of FIG. 3). For example, the at least one processor 201 may utilize an ML-based classification model (e.g., 241A of FIG. 3) to perform the classification. Alternatively, the at least one processor 201 may compare the application metadata with one or more threshold values, as elaborated herein, and utilize a decision tree, to perform the classification.

As shown is step S1015, the at least one processor 201 may store the data objects 10B of each group 240A in a dedicated storage set (e.g., element 211 of FIG. 3) of a logical address space (e.g., logical address space 210 of FIG. 3).

As shown is step S1020, the at least one processor 201 may transmit, move or copy the data objects of each storage 211 set to be stored in a respective, dedicated range of the NVM storage media. For example, the at least one processor 201 may communicate content of storage 211 set to a controller (e.g., NVM controller 360 of FIG. 3), which may in turn handle storage of the content of storage 211 In a dedicated, predefined space or range of NVM media 350.

Figure 6:
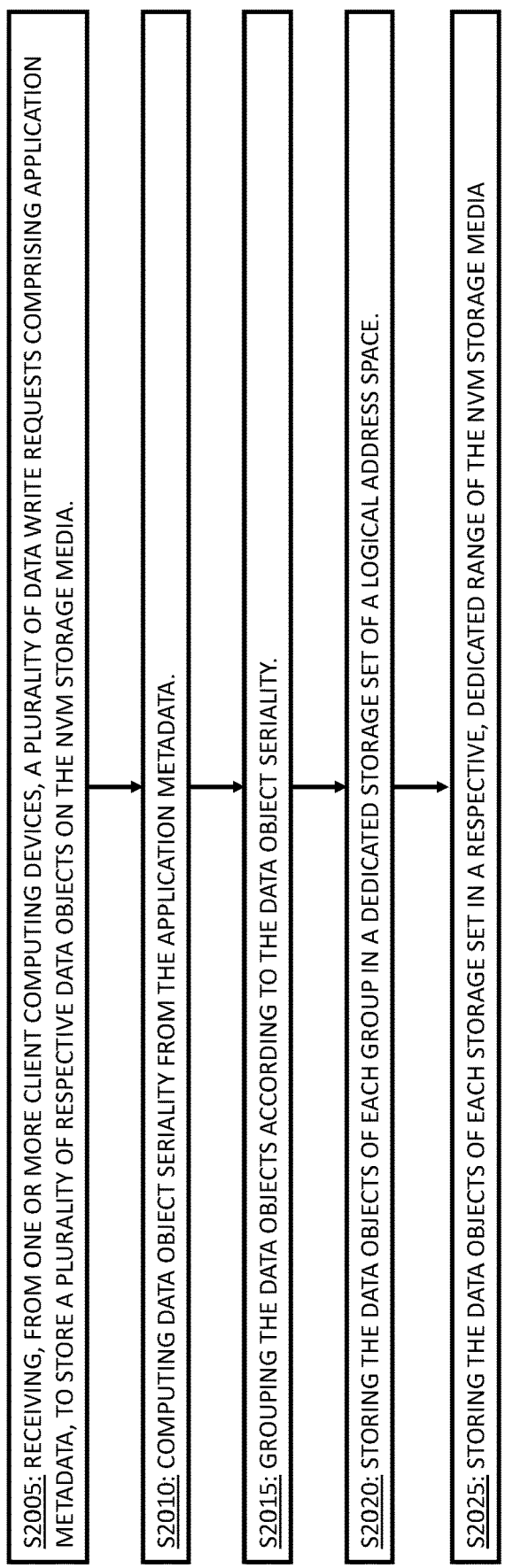
FIG. 6 is a flow diagram depicting yet another method of managing data storage on non-volatile memory storage media, according to embodiments of the invention.

Reference is now made to FIG. 6, which is a flow diagram depicting a method of managing data storage on non-volatile memory storage media by at least one processor, according to embodiments of the invention.

As shown is step S2005, the at least one processor (e.g., processor 201 of FIG. 3) may receive, e.g., from one or more client computing devices (e.g., client 10 of FIG. 2), a plurality of data access requests (e.g., data write requests) 10A comprising application metadata 10C, to store a plurality of respective data objects 10B on NVM storage media 350.

As shown is step S2010, the at least one processor 201 may compute a value of data object seriality from the application metadata 10C, and may maintain or store the data object seriality value as part of an application metadata 230A database.

As shown is step S2015, the at least one processor 201 may group the data objects 10B to groups or classes 240A according to the data object seriality. For example, the at least one processor 201 may compare the value of the computed data object seriality value to one or more seriality threshold values, and associate the data object 10B to a specific group based on these comparisons. For example, the one or more groups or classes 240A may each be associated with a corresponding range of seriality values, defined between a first seriality threshold value (e.g., a lower limit) and a second seriality threshold value (e.g., an upper limit). A computed data object seriality value may be compared to seriality threshold values that limit the range of seriality values that pertain to one or more groups or classes 240A. Subsequently, the relevant data object 10B may be associated with a specific group if the computed data object seriality value is between the lower limit and the upper limit.

As shown is step S2020, the at least one processor 201 may store or maintain the data objects of each group 240A in a dedicated storage set 211 of a logical address space 210

As shown is step S2025, the at least one processor 201 may move, copy or store the data objects 10C of each storage set in a respective, dedicated location or address range of physical storage on the NVM storage media 350.

Embodiments of the invention include a practical application for management of storage, e.g., by a storage server, of data objects on non-volatile memory storage media. Embodiments of the invention include an improvement of currently available storage technology by classifying or grouping the data objects, a-priori (e.g., before storage on the NVM media) and/or a posteriori (e.g., after storage on the NVM media). As elaborated herein, data objects pertaining to specific groups are maintained or stored separately on dedicated regions of the underlying NVM storage media, thus improving write amplification, endurance and latency of the NVM storage media. Additionally, embodiments of the invention facilitate ongoing, iterative update of the grouping and location of storage, so as to maintain or keep similar data objects (e.g., data objects of similar "temperature", size and/or seriality) stored together, or in adjacent locations within the NVM storage media.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

The invention claimed is:

1. A method of managing storage on non-volatile memory (NVM) storage media, by at least one processor, the method comprising:
receiving, from at least one client computing device, one or more data write requests, the data write requests associated with application metadata, to store one or more respective data objects on the NVM storage media;
performing a first classification of the one or more data objects, based on the application metadata, so as to associate each data object to a group of data objects;
storing the data objects of each group in a dedicated storage set of a logical address space;
transmitting the data objects of each storage set to be stored in a respective, dedicated range of the NVM storage media;
for each storage set of the logical address space:
assigning a dedicated garbage collection (GC) mechanism; and performing, by the dedicated GC mechanism, a dedicated GC process on data objects comprised in the storage set, in the logical address space;
obtaining, from a GC mechanism dedicated to a first storage set, GC metadata of a data object, that is comprised within the first storage set;
performing a second classification of the data object, based on the GC metadata;
updating the association of the data object, from the first group to a second group, according to the GC metadata;
moving the data object to a second storage set, dedicated to the second group; and
storing the data object in a range of the NVM storage media that is dedicated to the second storage set,
wherein performing the second classification of the data object comprises:
computing a value of time between rewrites (TBR) of the data object; and
comparing the computed TBR value to one or more TBR threshold values,
and wherein updating the association of the data object, from the first group to a second group is done based on said comparison.

2. The method of claim 1, further comprising:
computing a first seriality value of the one or more data objects, based on the application metadata, wherein the application metadata of a data object of the one or more data objects comprises a range of virtual addresses pertaining to the data object and a size of the data object, and wherein the first seriality value of the data object is computed as a function of the size of the data object and the range of virtual addresses pertaining the data object; and
comparing the first seriality value to one or more seriality threshold values,
wherein performing the first classification is further based on the comparison of the computed first seriality value to the one or more seriality threshold values.

3. The method of claim 2, further comprising computing the size of the one or more data objects, based on the application metadata, and wherein performing the first classification is further based on the computed size.

4. The method of claim 1, wherein each storage set is associated with one or more specific values of TBR thresholds.

5. The method of claim 2, wherein performing a second classification of the data object comprises: computing a second seriality value of the one or more data objects, based on the GC metadata, wherein the second seriality value of a data object of the one or more data objects is computed as a function between a size of the data object and a range of logical-level block addresses that include the data object, and wherein performing the second classification is further done based on the computed, second seriality value.

6. The method of claim 2, wherein performing a second classification of the data object comprises: computing a second seriality value of the one or more data objects, based on the GC metadata, wherein the second seriality value of a data object of the one or more data objects is computed as a function between a size of the data object and a range of logical-level block addresses that include the data object, and wherein performing the second classification is further done based on the first seriality value and the computed, second seriality value.

7. The method of claim 1, wherein the application metadata is selected from a list consisting of: a range of addresses pertaining to one or more data objects, a size of one or more data objects, a timestamp indicating a time of reception of a data write request of a data object, one or more application-level block addresses pertaining to a specific data write request, one or more logical-level block addresses that pertain to a specific data write request, an identification of a namespace to which data the object pertains, an identification of an application to which the data object pertains, an identification of a client computing device to which the data object pertains, an identification of a data stream to which the data object pertains, and an identification of a working set to which the data object pertains.

8. A method of managing storage on non-volatile memory (NVM) storage media, by at least one processor, the method comprising:
receiving, from at least one client computing device, one or more data write requests, the data write requests associated with application metadata, to store one or more respective data objects on the NVM storage media;
performing a first classification of the one or more data objects, based on the application metadata, so as to associate each data object to a group of data objects;
storing the data objects of each group in a dedicated storage set of a logical address space;
transmitting the data objects of each storage set to be stored in a respective, dedicated range of the NVM storage media;
for each storage set of the logical address space:
assigning a dedicated garbage collection (GC) mechanism; and
performing, by the dedicated GC mechanism, a dedicated GC process on data objects comprised in the storage set, in the logical address space;
obtaining, from a GC mechanism dedicated to a first storage set, GC metadata of a data object, that is comprised within the first storage set;
performing a second classification of the data object, based on the GC metadata;
updating the association of the data object, from the first group to a second group, according to the GC metadata;
moving the data object to a second storage set, dedicated to the second group; and
storing the data object in a range of the NVM storage media that is dedicated to the second storage set,
wherein the GC metadata is selected from a list consisting of: an age value of the data object, a validity status value of the data object, and a TBR value of the data object.

9. A system for managing storage on NVM storage media, the system comprising: a non-transitory memory device, wherein modules of instruction code are stored, and at least one processor associated with the memory device, and configured to execute the modules of instruction code, whereupon execution of said modules of instruction code, the at least one processor is configured to:
receive, from at least one client computing device, one or more data write requests, associated with application metadata, to store one or more respective data objects on the NVM storage media;
perform a first classification of the one or more data objects, based on the application metadata, to associate each data object to a group of data objects;
store the data objects of each group in a dedicated storage set of a logical address space; and
transmit the data objects of each storage set to be stored in a respective, dedicated range of the NVM storage media;

wherein the at least one processor is configured to:
assign a dedicated GC mechanism for each storage set of the logical address space, wherein the dedicated GC mechanism is configured to perform, within the respective storage set, a dedicated GC process on data objects that are stored in the respective storage set;
obtain, from a GC mechanism dedicated to a first storage set, GC metadata of a data object, that is comprised within the first storage set;
perform a second classification of the data object, based on the GC metadata;
update the association of the data object, from the first group to a second group, according to the GC metadata;
move the data object to a second storage set, dedicated to the second group; and
store the data object in a range of the NVM storage media that is dedicated to the second storage set,
wherein the at least one processor is configured to perform the second classification of the data object by:
computing a time between rewrites (TBR) value of the data object;
comparing the computed TBR value to one or more TBR threshold values; and
updating the association of the data object, from the first group to a second group, based on said comparison.

10. The system of claim 9, wherein the at least one processor is configured to:
compute a first seriality value of the one or more data objects, based on the application metadata, wherein the application metadata of a data object of the one or more data objects comprises a range of virtual addresses pertaining to the data object and a size of the data object, and wherein the processor is configured to compute the first seriality value of the data object as a function of the size of the data object and the range of virtual addresses pertaining the data object;
compare the first seriality value to one or more seriality threshold values; and
perform the first classification further based on the comparison of the computed first seriality value to the one or more seriality threshold values.

11. The system of claim 10, wherein the at least one processor is configured to:
compute the size of the one or more data objects, based on the application metadata, and
perform the first classification further based on the computed size.

12. The system of claim 9, wherein the at least one processor is configured to:
compute a second seriality value of the one or more data objects based on the GC metadata, wherein the second seriality value of a data object of the one or more data objects is computed as a function between a size of the data object and a range of logical-level block addresses that include the data object; and
perform a second classification of the data object, based on the computed, second seriality value.

13. The system of claim 9, wherein the at least one processor is configured to:
compute a second seriality value of the one or more data objects, based on the GC metadata, wherein the second seriality value of a data object of the one or more data objects is computed as a function between a size of the data object and a range of logical-level block addresses that include the data object; and
performing a second classification of the data object, based on the first seriality value and the computed, second seriality value.

14. The system of claim 9, wherein the at least one processor is associated with a machine-learning (ML) based model, and wherein the ML-based model is adapted to associate each data object to a group of data objects based on the GC metadata and application metadata.

15. The system of claim 14, wherein the ML-based model is a supervised ML-based model, trained to associate each data object to a group of data objects based on the GC metadata and application metadata, and wherein training the ML-based classification model is done based on performance feedback data of the NVM storage media, and wherein the performance feedback data is selected from a list consisting of: average read latency, tail read latency and write amplification.

16. The system of claim 14, wherein the ML-based model is an ML-based clustering model, adapted to associate each data object to a group of data objects based on the GC metadata and application metadata according to a best fit algorithm.

* * * * *